United States Patent [19]
Plager et al.

[11] Patent Number: 5,337,791
[45] Date of Patent: Aug. 16, 1994

[54] DYNAMIC SURGE SUPPRESSOR FOR FLUID FLOW LINES

[75] Inventors: Steven P. Plager, Burnsville; Daniel J. Kvinge, Shoreview, both of Minn.

[73] Assignee: Graco Inc., Golden Valley, Minn.

[21] Appl. No.: 184,356

[22] Filed: Jan. 21, 1994

Related U.S. Application Data

[63] Continuation of Ser. No. 965,808, Oct. 23, 1992, abandoned.

[51] Int. Cl.$^5$ .............................................. F16L 55/04
[52] U.S. Cl. ................................... 138/30; 138/31
[58] Field of Search ............... 138/30, 31; 137/568; 92/41, 43, 110, 111; 220/720, 721; 417/395, 540, 543

[56] References Cited

U.S. PATENT DOCUMENTS

| | | | |
|---|---|---|---|
| 330,540 | 11/1885 | Worthington. | |
| 1,767,100 | 6/1930 | Tannenhill | 417/543 |
| 1,893,685 | 1/1933 | Pirsch | 417/543 |
| 2,727,470 | 12/1955 | Ludwig | 417/543 |
| 3,188,975 | 6/1965 | Sprayberry et al. | 417/86 |
| 3,741,692 | 6/1973 | Rupp | 138/31 |
| 4,445,829 | 5/1984 | Miller | 417/543 |
| 4,556,087 | 12/1985 | Casilli | 138/30 |
| 4,676,323 | 6/1987 | Henriksson | 138/30 |
| 4,723,577 | 2/1988 | Wusterbarth | 138/30 |
| 5,036,879 | 8/1991 | Ponci | 138/30 |

*Primary Examiner*—Timothy F. Simone
*Assistant Examiner*—Patrick F. Brinson
*Attorney, Agent, or Firm*—Palmatier, Sjoquist & Helget

[57] ABSTRACT

A device for smoothing pressure fluctuations from a liquid pump, the device having a liquid chamber connectable to the pump and having an air chamber connectable to a source of pressurized air through an internal valve, the liquid chamber being separated from the air chamber by a diaphragm, the diaphragm connected to the valve, to permit pressurized air to equalize liquid pressure surges and to supplement liquid pressure drops, and to automatically adjust for changes in average liquid pressure delivery conditions.

6 Claims, 2 Drawing Sheets

DYNAMIC SURGE SUPPRESSOR FOR FLUID FLOW LINES

This is a continuation of U.S. application Ser. No. 07/965,808, filed Oct. 23, 1992, now abandoned.

BACKGROUND OF THE INVENTION

The present invention relates to an apparatus for smoothing pressure pulsations in fluid flow lines. The invention finds particular application when used in conjunction with a liquid pump which is driven by a reciprocable air motor, wherein the air motor reciprocates through a predefined stroke and reverses direction through the same stroke in the other direction; a liquid pump is typically mechanically linked to this motion, thereby causing pressure fluctuations at each of the reciprocation changeover points. The effect of this operation on the fluid being pumped is to cause periodic pressure fluctuations in the fluid delivery lines. Such fluctuations are undesirable when smooth fluid delivery is desired, and are also undesirable because they may create undue wear on the delivery system. Under typical operating conditions a reciprocable pump is set to deliver liquid at some average pressure value under nominal flow rate conditions. Under these conditions, the instantaneous pressure of liquid delivery from the pump may exceed the average value by 10%–20% during one portion of the pump piston stroke, and may drop below the average pressure value by 10%–20% during another portion of the pump piston stroke.

Devices for minimizing pulsations in liquid delivery lines are known in the art. For example, U.S. Pat. No. 1,893,685, issued Jan. 10, 1933, discloses a diaphragm air chamber connected to a liquid delivery line, wherein liquid pressure surges are absorbed in the diaphragm chamber by displacing a volume of pressurized air. U.S. Pat. No. 1,767,100, issued Jun. 24, 1930, discloses a liquid chamber in combination with an air chamber for absorbing pulsations in a liquid delivery line. U.S. Pat. No. 4,445,829, issued May 1, 1984, discloses an enlarged chamber downstream of a liquid delivery pump, coupled with a gas-filled bladder for dampening pressure pulses which pass through the chamber. U.S. Pat. No. 3,188,975, issued Jun. 15, 1965, discloses a hydraulic piston connected to an air piston, wherein the hydraulic piston is responsive to hydraulic impulses, and causes the air piston to act against an air cushion, thereby diminishing pressure surges.

SUMMARY OF THE INVENTION

The present invention is a pressure surge suppressor for equalizing the pressure variations from a liquid delivery pump, particularly a liquid delivery pump operated by pressurized air. The invention includes a diaphragm separating the interior chambers of the device into two regions; a first region for containing pressurized air, including a slidable air valve for controlling the air pressure, and a second region for insertion into the liquid flow delivery line output from the pump. The air valve is connected to the diaphragm and is slidably movable therewith. The air valve is slidable over a range of distance in blocking position to two interior passages: a first interior passage which couples the first region to an exhaust port, and a second interior passage which couples the interior region to a pressurized air port. Under normal liquid delivery conditions from the pump, the slide valve reciprocates with the diaphragm and remains in blocking position relative to both passages, about a center point which is representative of the average liquid pressure output. If the average liquid pressure increases, either by way of an increase in back pressure or by way of an increased pressure setting for the pump, the slide valve reciprocates about the new average pressure setting. If the average liquid pressure decreases, either by way of a decrease in the liquid back pressure or a decreased pump pressure setting, the slide valve reciprocates about a point representative of the lower average setting. Under conditions of sufficiently high average liquid pressure the slide valve reciprocates to a point wherein the passages leading to the pressurized air port become uncovered, and pressurized air is admitted into the first region; under conditions of sufficiently low average pressure the slide valve reciprocates over a range which uncovers the passages between region 1 and the exhaust port. Both of these conditions cause an equalization of air pressure in the first region to balance the increase in average liquid pressure in the second region, thereby creating a new average set point for the reciprocating slide valve. In all cases of instantaneous liquid pressure in the second region, the diaphragm moves to expand or contract the volume of the second region, balanced by air pressure in the first region, to smooth the instantaneous pressure variations in the delivery lines of the system.

It is the principal object of the present invention to provide a device for equalizing pressure surges in the liquid delivery lines from a reciprocable pump.

It is another object of the present invention to provide a surge suppressor having an internal valving arrangement to regulate air pressure within the surge suppressor, under a wide range of liquid pressure delivery conditions.

It is a further object of the present invention to provide a dynamic surge suppressor utilizing a simple valve design to reduce the liquid surge pressure from a pump.

BRIEF DESCRIPTION OF THE DRAWINGS

The foregoing and other objects and advantages of the invention will become apparent from the following specification and claims, and with reference to the drawings, in which:

DESCRIPTION OF THE PREFERRED EMBODIMENT

Figure 1:
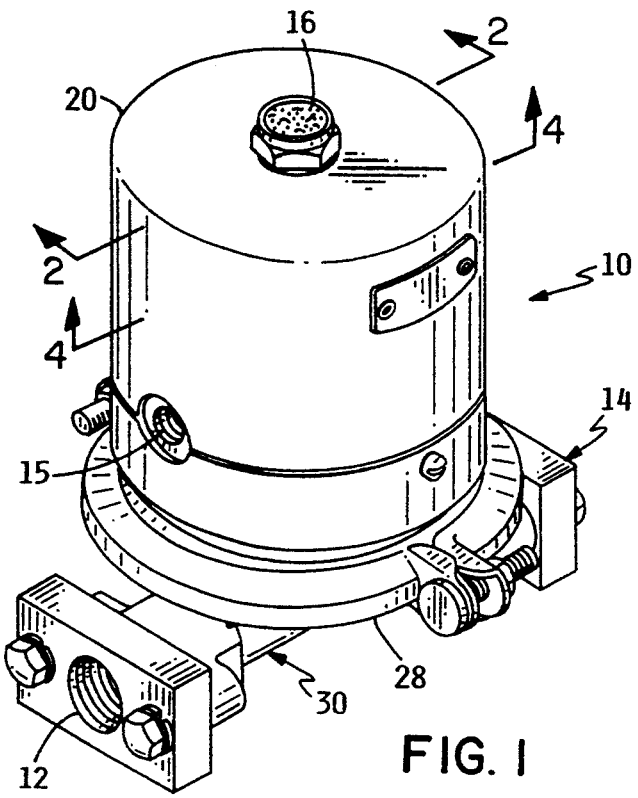
FIG. 1 shows an isometric view of the invention.

Referring first to FIG. 1 there is shown a surge suppressor 10, in isometric view, and of a preferred construction of the present invention. Surge suppressor 10 has a liquid delivery inlet 12 and a liquid outlet 14, joined together by internal flow-through passages. Liquid delivery inlet 12 may be coupled to a pump output, and outlet 14 may be connected to a liquid supply line. The liquid supply line, in turn, may be connected to any of the number of industrial devices for which pressurized liquid is required.

Surge suppressor 10 also has an inlet 15 which is adapted for coupling to a pressurized air line; preferably, the same pressurized air line as is utilized to connect pressurized air to the liquid delivery pump. An air exhaust 16 is provided in surge suppressor 10. The air inlet 15 and exhaust 16 are preferably openings in an upper housing 20, which houses the components associated with the air portion of the invention. The liquid inlet 12 and liquid outlet 14 are formed in lower housing 30, which houses the pressurized liquid components of the invention. Upper housing 20 is affixed to lower housing 30 by means of a ring fastener 28 which may be tightened about adjacent flanges in the respective housings to provide a tight connection therebetween.

Figure 2:
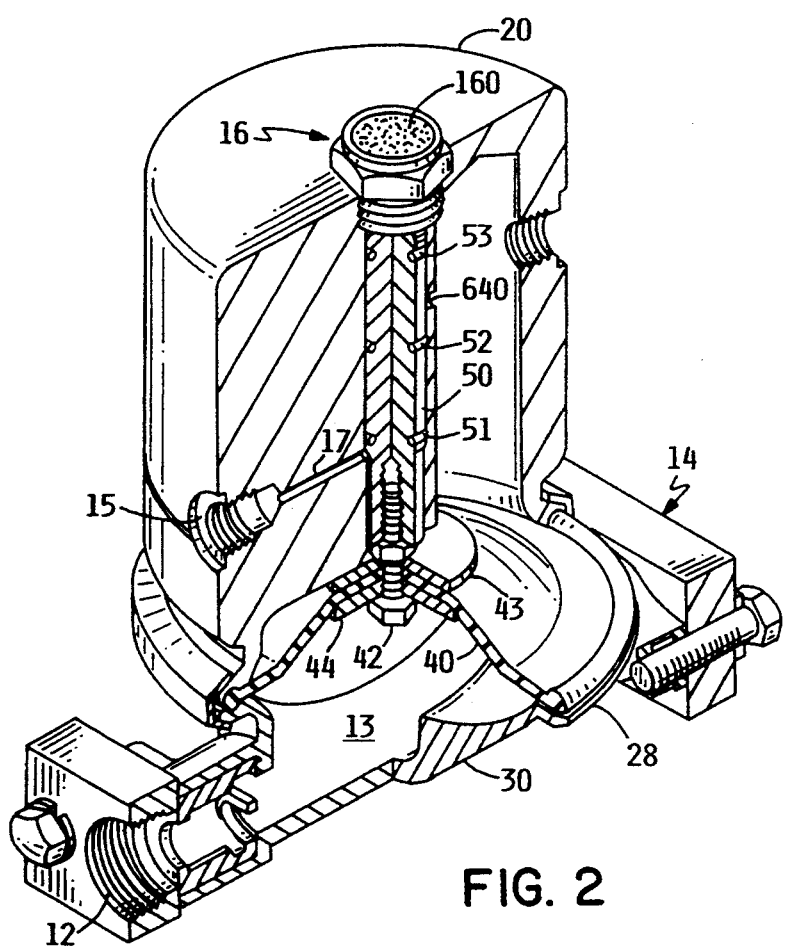
FIG. 2 shows a cross-sectional view taken along the lines 2—2 of FIG. 1.
Figure 4:
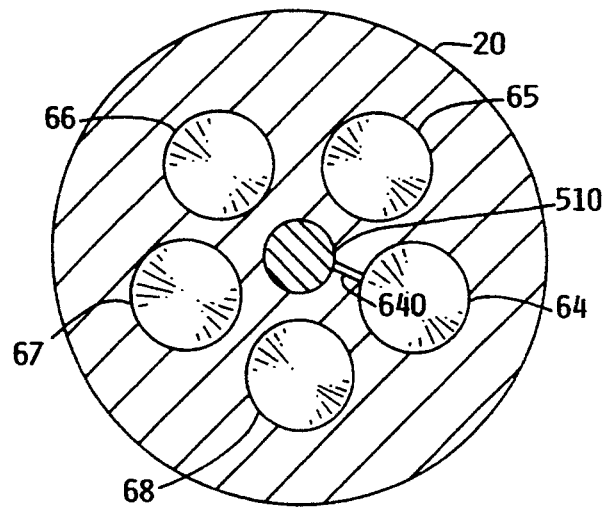
FIG. 4 shows a cross-sectional view taken along the lines 4—4 of FIG. 1.

FIG. 2 shows a cross-sectional view taken along the lines 2—2 of FIG. 1, wherein housing 20 is revealed to have a number of internal chambers (see also FIG. 4). Lower housing 30 has an internal flow through chamber 13 which permits liquid flow between inlet 12 and outlet 14. A diaphragm 40, preferably made from rubber, plastic or other resilient material, is clamped between housings 20 and 30, by the ring clamp 28 previously described. Diaphragm 40 effectively isolates the air portion of the invention housed in housing 20 from the liquid portion of the invention in housing 30.

A threaded fastener 42 clamps the center portion of diaphragm 40 between disks 43, 44, and is threaded into stem 50 which forms a slide valve 50. Slide valve 50 is freely slidable within a passage in housing 20, and has three O-rings 51, 52, 53 to provide an airtight seal. Air inlet 15 is coupled via a passage 17 to the lower end of slide valve 50, for purposes of admitting pressurized air into the air volume created above diaphragm 40.

The interior of upper housing 20 is formed into a plurality of chambers, including chamber 510 which houses slide valve 50. Other chambers are air chambers 64, 65, 66, 67, 68 (see FIG. 4), each of which are closed at their upper ends and are open into the diaphragm chamber at their lower ends. A passage 640 is formed between chamber 64 and chamber 510 for purposes which will be hereinafter described. The top end of chamber 510 is closed by a threaded coupling which has a porous material 160 confined therein. Porous material 160 constitutes an air muffler for reducing the sound level of air exhaust which escapes from exhaust 16. Chambers 64–68 are distributed more or less evenly about the interior of housing 20.

Figure 3A:
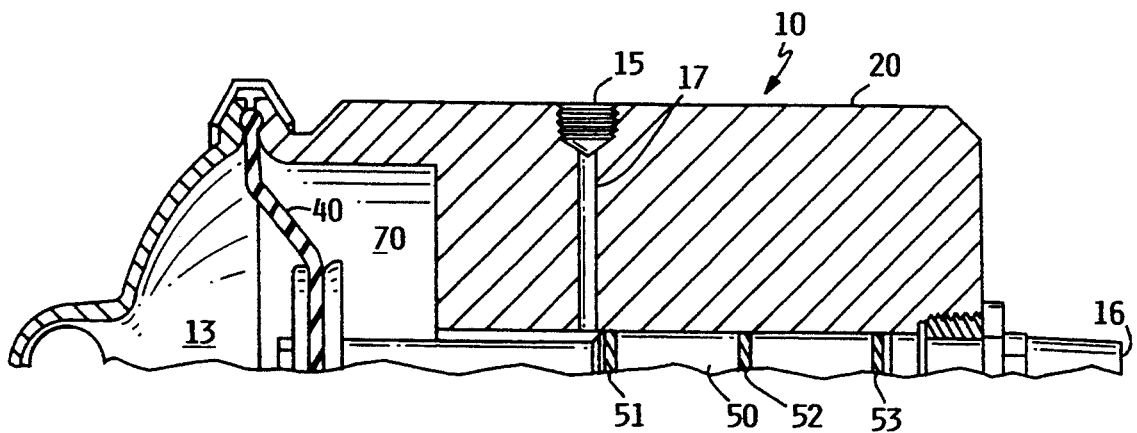
FIG. 3A shows a cross-sectional view under high liquid delivery conditions.

FIG. 3A shows surge suppressor 10 under conditions of excessively high instantaneous liquid pressure. Under these conditions, the pressure of liquid in liquid chamber 13 is increased due to the pumping action of the pump which is connected to the surge suppressor 10. This causes the diaphragm 40 to move rearwardly to a position as shown in FIG. 3A, against the air pressure in diaphragm chamber 70. If the air pressure in diaphragm chamber 70 is sufficiently low, slide valve 50 will move to the position shown in FIG. 3A, thereby opening air inlet 15 and passage 17 into flow coupling relationship with diaphragm chamber 70. This permits the pressurized air which drives the pump to be coupled into diaphragm chamber 70, thereby moving diaphragm 40 forwardly and balancing the liquid pressure in chamber 13.

Figure 3B:
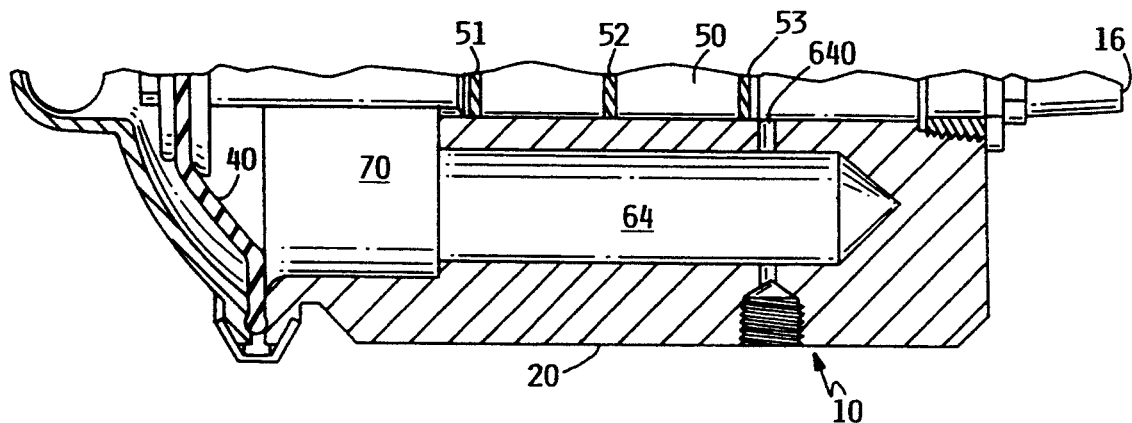
FIG. 3B shows a cross-sectional view under low liquid delivery pressure conditions.

FIG. 3B shows the operating condition of surge suppressor 10 under conditions of excessively reduced instantaneous liquid pressure. Under these conditions, the air pressure in diaphragm chamber 70 is greater than the liquid pressure in chamber 13, thereby causing diaphragm 40 to move forwardly to a position as shown. When this occurs, slide valve 50 moves leftward and uncovers passage 640 which is in direct flow relationship with chamber 64, and in indirect flow relationship with chambers 65–68. Under these circumstances the pressurized air in chambers 64–68, and in diaphragm chamber 70, becomes relieved to atmosphere via exhaust outlet 16, thereby reducing the air pressure and equalizing the pressure imbalance across diaphragm 40. Diaphragm 40 will then return to a more neutral position approximately centered between liquid chamber 13 and diaphragm air chamber 70. Once the diaphragm 40 has returned to a more neutral position, diaphragm 40 will continue to reciprocate in response to pressure surges and pressure drops in a liquid chamber 13, and slide valve 50 will continue to reciprocate in response thereto, but the reciprocation range of slide valve 50 will be insufficient to uncover either the air pressure passages or the air exhaust passages. This is therefore the mechanism utilized to enable the surge suppressor 10 to constantly and automatically readjust its operating point to accommodate changed average pressure conditions.

The operational conditions shown in FIG. 3A occur as a result of increased average pressure in the liquid delivery lines of the liquid pump which is connected to surge suppressor 10. The conditions illustrated by the operational position of FIG. 3B occur as a result of decreased average pressure in the liquid delivery lines of the liquid pump. In one sense the surge suppressor 10 acts as an accumulator to accumulate excessive liquid during conditions of high-pressure delivery, and to replenish deficient liquid supply during conditions of low pressure delivery. The accumulator is self-adjusting to accommodate pressure fluctuations in the delivery lines under various pump pressure settings, and under various delivery line back pressure conditions. For example, if the delivery lines are coupled to a device which does not present a constant pressure load, the variations in back pressure caused by changes in the device load will be automatically accommodated by the surge suppressor 10, wherein the air pressure needed to balance the changed back pressure conditions will be automatically adjusted.

In operation, air inlet 15 is preferably coupled to the same pressure air line which is attached to the air motor which operates the liquid pump. The liquid pump outlet is connected to liquid inlet 12 of surge suppressor 10, and liquid outlet 14 of surge suppressor 10 is connected to the liquid supply line. Once these connections are made the surge suppressor 10 will automatically compensate for high and low pressure fluctuations, and will under most conditions operate within a relatively limited stroke of slide valve 50 and diaphragm 40.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for smoothing pressure fluctuations from a liquid delivery pump, comprising:
   a) a housing having a liquid inlet connectable to said liquid delivery pump, and having a liquid outlet; said housing having a central axis and having a plurality of internal air chambers arranged about said central axis;

b) an internal diaphragm chamber in said housing; said diaphragm chamber having a first section in flow communication with said liquid inlet and said liquid outlet, and a second section in flow communication with said plurality of internal air chambers;

c) a diaphragm membrane separating said first diaphragm chamber section from said second diaphragm chamber section, and having an attachment point aligned along said central axis;

d) a valve bore in said housing aligned along said central axis; said valve bore running substantially parallel to said plurality of internal air chambers, a first end of said valve bore opening into said diaphragm chamber second section and a second end of said valve bore opening external to said housing;

e) a first passage in said housing running between the housing exterior and said valve bore proximate said first end, and a second passage in said housing running between one of said plurality of internal air chambers and said valve bore proximate said second end;

f) a valve member in said valve bore slidably positionable between a first position wherein only said first passage is covered, and a second position wherein only said second passage is covered, and an intermediate position wherein both said first and second passages are covered; and g) means for connecting said valve member to said diaphragm membrane attachment point.

2. The apparatus of claim 1, wherein said plurality of internal air chambers are arranged symmetrically in said housing about said central axis.

3. The apparatus of claim 1, further comprising a plurality of O-ring seals about said valve member, in sealing engagement against said valve bore.

4. The apparatus of claim 3, wherein said means for connecting said valve member to said diaphragm membrane attachment point further comprises a stem extending from said valve member.

5. The apparatus of claim 2, wherein said plurality of internal air chambers further comprise a plurality of bore holes in said housing.

6. The apparatus of claim 5, further comprising an air diffuser mounted to said housing at said valve bore second end.

* * * * *